(12) United States Patent
Mansour et al.

(10) Patent No.: US 8,565,436 B2
(45) Date of Patent: Oct. 22, 2013

(54) SECURE SELF MANAGED DATA (SSMD)

(75) Inventors: Rasta A. Mansour, San Jose, CA (US);
Hadi Nahari, Mountain View, CA (US)

(73) Assignee: EBAY Inc., San Jose, CA (US)

( * ) Notice: Subject to any disclaimer, the term of this patent is extended or adjusted under 35 U.S.C. 154(b) by 376 days.

(21) Appl. No.: 12/415,355

(22) Filed: Mar. 31, 2009

(65) Prior Publication Data

US 2010/0150352 A1 Jun. 17, 2010

Related U.S. Application Data

(60) Provisional application No. 61/122,653, filed on Dec. 15, 2008.

(51) Int. Cl.
*H04L 9/08* (2006.01)

(52) U.S. Cl.
USPC .......................................... 380/281; 380/45

(58) Field of Classification Search
USPC .............. 380/44, 45, 278, 279, 281, 282, 285
See application file for complete search history.

(56) References Cited

U.S. PATENT DOCUMENTS

| | | | | |
|---|---|---|---|---|
| 4,933,971 A | * | 6/1990 | Bestock et al. | 380/44 |
| 5,937,066 A | * | 8/1999 | Gennaro et al. | 380/286 |
| 6,049,612 A | * | 4/2000 | Fielder et al. | 380/44 |
| 6,215,877 B1 | * | 4/2001 | Matsumoto | 380/277 |
| 6,430,292 B1 | * | 8/2002 | Ito et al. | 380/280 |
| 7,757,101 B2 | * | 7/2010 | Nonaka et al. | 713/194 |
| 7,761,704 B2 | * | 7/2010 | Ho et al. | 713/158 |
| 7,913,311 B2 | * | 3/2011 | Alain et al. | 726/28 |
| 7,962,765 B2 | * | 6/2011 | Malcolm | 713/193 |
| 2001/0051927 A1 | * | 12/2001 | London et al. | 705/51 |
| 2003/0037070 A1 | * | 2/2003 | Marston | 707/200 |
| 2007/0143339 A1 | * | 6/2007 | Springett | 707/103 R |
| 2007/0223706 A1 | * | 9/2007 | Gantman et al. | 380/286 |
| 2008/0089516 A1 | * | 4/2008 | Cocchi et al. | 380/200 |
| 2008/0320314 A1 | * | 12/2008 | Eckleder et al. | 713/189 |
| 2009/0235091 A1 | * | 9/2009 | Kurn et al. | 713/193 |
| 2010/0005318 A1 | * | 1/2010 | Hosain | 713/193 |

* cited by examiner

*Primary Examiner* — Jung Kim
*Assistant Examiner* — Tri Tran
(74) *Attorney, Agent, or Firm* — Haynes and Boone, LLP

(57) ABSTRACT

A system, according to one embodiment, includes a master key for encryption of data; an encryption key site accessible by computer and storing a first piece of the master key; a configuration file resident in a computer file system, the configuration file storing a second piece of the master key; a computer database storing a third piece of the master key; a master-key seal key used to encrypt the master key, wherein a secure self managed data (SSMD) key is obtained by assembling and decrypting the first piece, the second piece and the third piece using the master-key seal key; a unique ID for the data; a classification level for the data; and an expiration time for the data, wherein the data, the unique ID, the classification level, and the expiration time are encrypted together using the SSMD key to form an SSMD encoded data.

20 Claims, 5 Drawing Sheets

| Application | SSMD | Key Site | Decryption (AES) |
|---|---|---|---|
| 501. Some application needs access to some SSMD encoded data. | | | |
| 502. Data classification of the identity associated with the Application is obtained. | | | |
| 503. The SSMD encoded data, and the unique ID associated with that data is obtained. | | | |
| 504. Application specific master encryption key is obtained from key site. | | | |
| 505. SSMD Data + unique ID + Classification level + master application key is sent to SSMD. | 506. SSMD master encryption key is obtained from key site. | Get the symmetric encryption key for this application. | |
| | 507. A decryption key is generated from XOR of unique ID and SSMD master encryption key. XOR is done to the low significant bits of SSMD master key. | Get the symmetric encryption key for this application. | |
| | 508. Decrypt the SSMD data using the decryption, key, per step #507. | | Decrypt using 128 or 256 bit AES |
| | 509. Obtain the behavior object from the decrypted data; Validate the SSMD Tag ID to make sure the decryption succeeded correctly; check the classification level of the caller to that of the data; caller classification level must subsume that of the data; and check the expiration time/date to validate the data is not expired; If any check fails, an exception is returned to the caller application. | | |
| | 510. Create a data decryption key as master application key + unique ID. Specifically, unique ID is XOR'd to the low significant bits of master application key. | | |
| | 511. Decrypt the Data using the above key. | | Decrypt using 128 or 256 bit AES |
| | 512. Return the decrypted data to the calling application. | | |
| 513. SSMD decoded data is returned back from SSMD if data has not expired, and the classification level of the application subsumes that of the requested data. Otherwise, an exception is returned from SSMD. | | | |

FIG. 5

SECURE SELF MANAGED DATA (SSMD)

RELATED APPLICATIONS

This application claims priority to U.S. Provisional Application Ser. No. 61/122,653 filed on Dec. 15, 2008, the contents of which are incorporated by reference.

BACKGROUND

1. Technical Field

Embodiments of the present disclosure generally relate to data security and, more particularly, to providing secure data that is self-protecting.

2. Related Art

Secure data is desired or needed in many different fields of endeavor, especially with the increased availability and use of the Internet and electronic data storage. Financial or personal data, for example, can be especially sensitive and may require that only one or a very select few people can access the data. Companies invest large amounts of time, money, and resources into making sure sensitive data is secure. Data security may be useful both to the public (e.g., consumers) as well as to the government for compliance with regulations requiring certain levels of security for companies managing or using secure data. Examples of secure data include a person's date of birth, social security number, mother's maiden name, place of birth, financial institution account numbers, and account passwords. Means to secure data include, for example, investing in secure databases with secure firewall networks, installing management applications to determine when certain data expire or are to be archived, and encrypting data with keys.

Most, if not all, however, of current means for securing data require investment in the infrastructure needed to protect the data.

SUMMARY

According to one embodiment, a system includes a master key for encryption of data; a master encryption key site accessible by a computer; a stored first piece of the master key; a configuration file resident in a computer file system, the configuration file storing a second piece of the master key; a computer database storing a third piece of the master key; a master-key seal key used to encrypt the master key, wherein a secure self managed data (SSMD) key is obtained by assembling and decrypting the first piece, the second piece and the third piece of the master key using the master-key seal key; a unique ID for the data; a classification level for the data; and an expiration time for the data, wherein the data, the unique ID, the classification level, and the expiration time are encrypted together using the SSMD key to form an SSMD encoded data.

The SSMD encoded data may be encoded twice using two keys, a unique ID for the data, a security level for the data, and an expiration for the data. This encoded data can be placed on public (i.e., unsecure sites and storage) and still satisfy security requirements. Access to the encoded data requires a unique key and the proper security level for the person accessing the data.

For encryption of the data: 1) some application generates some data; 2) data is assigned a classification; 3) data is assigned a unique ID, and an expiration period; 4) an application specific master encryption key is obtained from eSAMS or other key site; 5) data+unique ID+expiration period+data classification level+master application key is encoded; 6) SSMD encoded data is returned back from SSMD; and 7) the application stores the SSMD encoded data to where it wishes.

Encoding in step 5) above may be done according to the following: 1) SSMD creates a unique data encryption key as master application key+unique ID; specifically, the unique ID may be XOR'd to the low significant bits of the master application key; 2) SSMD encrypts the data using the above key, using AES crypto algorithm, or a similar strong crypto algorithm; 3) SSMD creates an object from the combination of creation time/date+expiration period+classification level+unique ID+an SSMD tag identifier; this object is called a data behavior object (time/date may be in GMT format; expiration period may be in seconds); 4) an SSMD specific master encryption key is obtained from eSAMS or other similar key site; 5) a unique behavior encryption key is generated from the XOR of the unique ID and SSMD master encryption key; XOR may be done to the low significant bits of SSMD master key; 6) SSMD encrypts the behavior object+encrypted data, per step 2, using the encryption key per step 5; 6) an external object containing expiration date in GMT format and classification level is generated and appended to the encoded data; the data-flag is set to AES as encryption algorithm; and 7) SSMD returns the encrypted data+behavior object, per step 6, to the calling application.

For decryption of the data: 1) some application needs access to some SSMD encoded data; 2) data classification of the identity associated with the application is obtained; 3) the SSMD encoded data, and the unique ID associated with that data is obtained; 4) an application specific master encryption key is obtained from eSAMS or a similar key site; 5) SSMD data+unique ID+classification level+master application key is sent to SSMD for decoding; and 6) SSMD decoded data is returned back from SSMD if data has not expired, and the classification level of the application subsumes that of the requested data.

Decoding in step 5) is done according to the following: 1) an SSMD specific master encryption key is obtained from eSAMS or a similar key site; 2) a decryption key is generated from the XOR of the unique ID and SSMD master encryption key; XOR may be done to the low significant bits of SSMD master key; 3) SSMD decrypts the SSMD data using the decryption key, and the crypto algorithm per data-flags; 4) SSMD obtains the behavior object from the decrypted data; validates the SSMD tag identifier to make sure the decryption succeeded correctly; checks the classification level of the caller to the that of the data; caller classification level must subsume that of the data; and checks the expiration time/date based on the current time to validate the data is not expired; if any check fails, an exception is returned to the caller application; 5) SSMD creates a data decryption key as master application key+unique ID; specifically, the unique ID may be XOR'd to the low significant bits of the master application key; 6) SSMD decrypts the data using the above key; and 7) SSMD returns the decrypted data to the calling application.

These and other features and advantages of the present invention will be more readily apparent from the detailed description of the embodiments set forth below taken in conjunction with the accompanying drawings.

BRIEF DESCRIPTION OF THE FIGURES

FIG. 5 is a flowchart diagram illustrating data decryption in accordance with an embodiment of the present invention.

Figure 1:
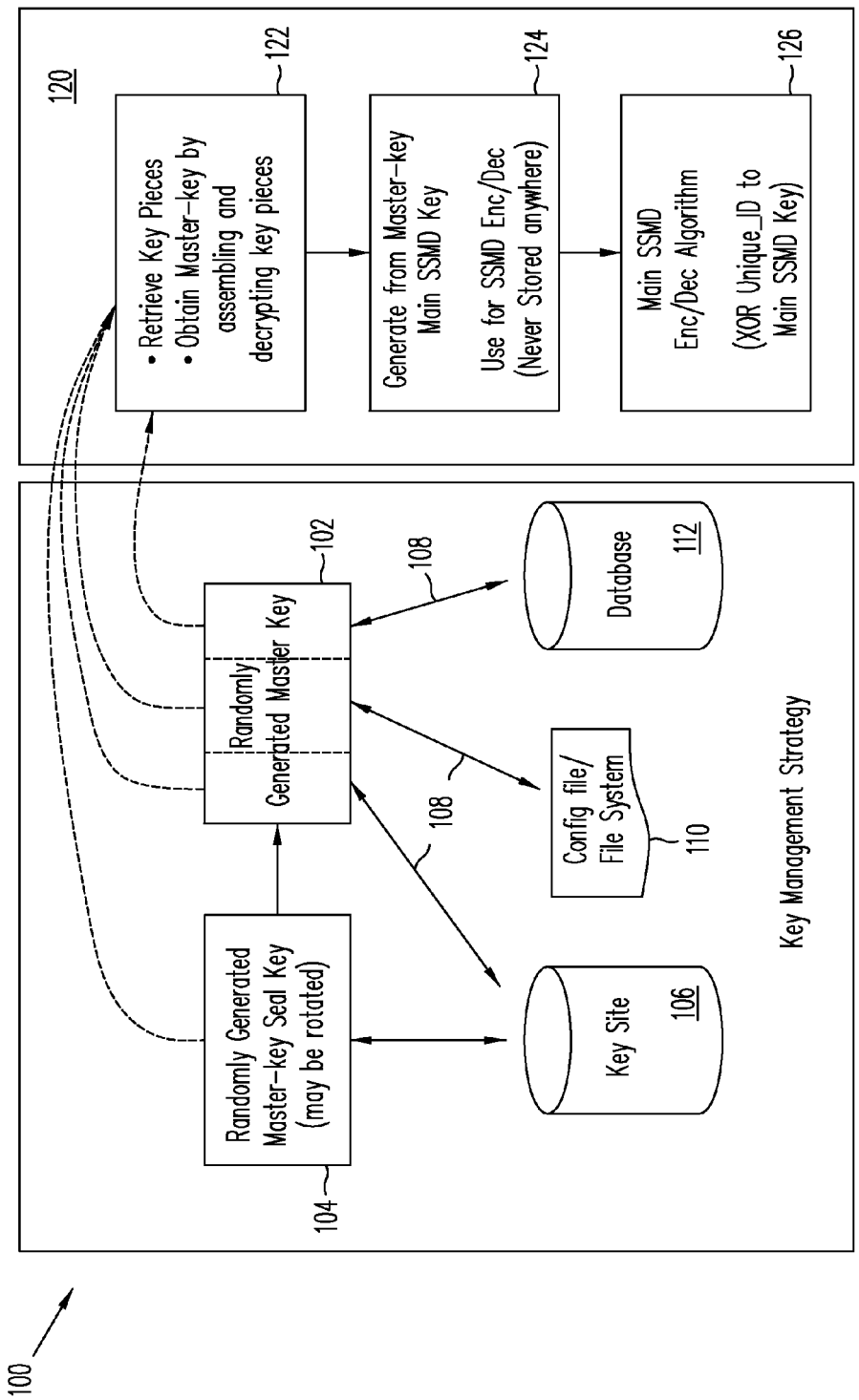
FIG. 1 is a system diagram illustrating a system for providing security to data in accordance with an embodiment of the present invention.

Exemplary embodiments and their advantages are best understood by referring to the detailed description that follows. It should be appreciated that like reference numerals are used to identify like elements illustrated in one or more of the figures, wherein showings therein are for purposes of illustrating exemplary embodiments and not for purposes of limiting the same.

DETAILED DESCRIPTION

Embodiments of the present disclosure relate to systems and methods for providing secure, self-managed data (SSMD) for which data is encoded twice using two keys, a unique ID is created for the data, a security level is assigned for the data, and an expiration time (e.g., date and time) is given for the data. This encoded data can be made public, such as on publicly available sites (i.e., unsecure sites and storage) and still satisfy security requirements. Access to the encoded data may require a unique key (e.g., SSMD master encryption key) and the proper security level for the person (e.g., a user of a computer application) accessing the data.

Secure, self-managed data in accordance with disclosed embodiments may be useful, for example, in the management of large numbers of unique encryption keys through the use of a single encryption key. Such management may be needed, for example, with Credit Card Verification code—also referred to as "Card Verification Value" (CVV)—encoding in Payment Gateway (PGW) or with URL (uniform resource locater) encoding as part of a user verification and registration process. Another example is self expiration of data anywhere encrypted (or sensitive) personally identifiable information (PII) and restricted data is stored. Another example is extension of Payment Card Industry (PCI) compliance to a larger portion of a company, because of the ability to properly safe store PII and payment data no matter where the application is hosted and run. Yet another example is management and recovery of passwords assigned to users. In one example, a classification level L3 may be assigned to an SSMD encrypted password data and the data may be set to expire immediately; a highly privileged CSR (Customer Service Representative) agent with classification L4 can then recover a lost password for a user. Still another example is the use of an SSMD algorithm as the basis for creating a self-secure storage backend for secure applications like eSAMS (eBay Secure Artifact Management System) and ASAC (Admin Secure Access Control), for example. To illustrate: all data that eSAMS owns and manages (e.g., encryption keys and certificates) can be encoded by SSMD so that all such data can be stored in a non-secure database, and in a non-secure environment, if desired to save cost, and simplify data recovery.

Referring to FIG. 1, an SSMD system 100 is illustrated in accordance with one embodiment. SSMD system 100 shows a key management scheme to properly protect its main key against a variety of subsystem compromises. FIG. 1 illustrates an example of SSMD master key creation, storage, and usage. At module 102, an SSMD master key is randomly generated. Module 102 is shown broken to illustrate that the SSMD master key may be broken into parts (e.g., three parts) or, for example, generated as multiple pieces. The SSMD master key may be user provided or computer generated. At module 104, an envelope seal key (also referred to as master key seal key) is randomly generated. The seal key is used to encrypt the SSMD master key. The seal key may be safely stored in a key site 106 (e.g., using eSAMS) as is, e.g., without further encryption. The encrypted (sealed) SSMD master key may be broken into three parts that may be stored separately as indicated by arrows 108. One part may be stored in key site 106. Another part may be stored, for example, in a configuration file on file system 110, and an additional part may be stored in a database 112. Each part of the encrypted SSMD master key may be safely stored as is because the SSMD master key is sealed using the master key seal key generated in module 104.

Subsystem 120 illustrates an example of usage of the SSMD master key. At module 122, the seal key is retrieved from key site 106, and the multiple parts (e.g., three parts) of the sealed SSMD master key are retrieved from storage, e.g., from key site 106, file system 110, and database 112. The parts of the sealed SSMD master key are reassembled and unsealed, e.g., decrypted, to recover the SSMD master key. At module 124, the SSMD master key may be used to generate a main SSMD key, which may be used for encryption and decryption and is not stored anywhere. At module 126, a unique ID (identification) may be used to modify the main SSMD key (e.g., the unique ID may be XOR'd into the main SSMD key) and a hash function of the modified key may be used as an SSMD encryption and decryption key for general data encryption using SSMD system 100.

The following considerations may be applied to system 100. First, a brute force attack on an SSMD encrypted object, e.g., data, is impractical because of the inherent security strength of 128 (or 256) Advanced Encryption Standard (AES) encryption used in SSMD system 100. AES is an encryption standard adopted by the U.S. government. The standard comprises three block ciphers, AES-128, AES-192 and AES-256. Each AES cipher has a 128-bit block size, with key sizes of 128, 192 and 256 bits, respectively. Second, even if successful, it will not yield anything significant, because each SSMD object encryption key is unique by virtue of XOR'ing a unique ID to it, and then taking a one-way hash function of that combination. Thus, a compromised SSMD encrypted object will not yield any information that can be used for other SSMD encrypted objects. In particular, it will not yield recovery of the SSMD master key because of the strength of the one-way hash function.

Aside from brute force, another attempt at compromising SSMD system 100 may be to compromise key site 106. In case, for example, the seal key is lost, and maybe even a fragment of the sealed master key, still not enough information is compromised to yield recovery of the SSMD master key. Therefore, SSMD system 100 is secure against failure (compromise) of key site 106. The same is true for individual or combined failure (compromise) of information stored in configuration file or file system 110 and database 112. Any or all of key site 106, file system 110, and database 112 may fail, and still the SSMD main key may not be compromised. In fact, the following collection of compromises must happen before the SSMD main key is retrievable, and the probability of a cascaded subsystem compromise of this magnitude is very low: 1) key site 106 must be compromised (e.g., get the seal-key, first fragment of sealed main key, and possibly application key); 2) configuration file or file system 110 must be compromised (e.g., get the second fragment of the sealed main key); 3) database 112 must be compromised (e.g., get the third fragment of the sealed main-key); 4) application, unique ID, and classification level must be compromised (e.g., get the final pieces for SSMD decryption). Thus, SSMD system 100 protects the SSMD main key against both brute force attack and multiple subsystem compromises.

An additional strength is that the actual SSMD main key used for encrypting each object is never stored anywhere or shared with anyone. Thus, only through brute force, multiple subsystem compromise, or direct Java Virtual Machine (JVM) memory pick can the SSMD main key be retrieved. For that latter case, it may be desirable that in-memory copies of the SSMD main key are quickly wiped clean by zeroing them out after each use. This, coupled with proper garbage collection, JVM access security, and proper operating system (OS) security, may protect against this kind of failure.

In addition, SSMD system 100 allows for periodic SSMD key rotation. For example, multiple fragments of the sealed SSMD main key may be retrieved, assembled together, and unsealed by the seal key obtained from key site 106; a new random seal key may be generated and stored back in key site 106; and the SSMD main key may be sealed again using the newly generated seal key and re-stored as multiple fragments. Such key rotation may be considered safe because: 1) Multiple subsystem compromises typically do not occur at the same time, but usually occur over a period of time. Thus, rotation may assure that failed (compromised) sealed SSMD main key fragments have no further value. The same is true for a failed seal key if key site 106 has failed; 2) Each SSMD encrypted object is encrypted with a unique encryption key because of XOR'ing a unique ID into the SSMD main key and hashing the result. As such, each encryption key is unique, therefore, there is no need to generate "new" keys by rotating the master-key. In fact, the simplicity and beauty of SSMD system 100 is that the SSMD master key is immutable, but never known to anyone or anything, except to the run-time SSMD algorithm, because of key sealing and multiple key fragmentation; and 3) Because four pieces of information are needed to launch a brute force attack against any SSMD encrypted object, with at least two of those pieces having security complexity strength of the 128-bit AES key, the data already encrypted by SSMD may be secure. If needed, however, that data can be re-encrypted again with the SSMD master key. Each SSMD encryption, even with the same key and data may produce a new encrypted content, because of the fact that SSMD system 100 uses a nonce (or time stamp; in security engineering, "nonce" stands for "number used once") in the data mix, every time SSMD system 100 encrypts an object. The four pieces of information needed to launch a brute force attack are: i) unique-ID (e.g., 64-bit string), ii) classification level (e.g., requires a signed Security Assertion Markup Language (SAML) document if the identity classification layer (ICL) is in place; also this will be of the order of 128-bit AES key to forge a brute force attack), iii) SSMD main key (e.g., minimum 128-bit AES key strength), iv) application key (e.g., minimum 128-bit AES key strength).

To summarize, SSMD system 100 may be secure against both brute force attack and multiple subsystem compromise. SSMD system 100 may provide a key rotation strategy, if needed. Implemented properly, with proper precautions taken at JVM and OS level, SSMD system 100 can be a hard system to compromise. Even in the event of multiple subsystem compromises, SSMD system 100 may still protect the secrecy of the SSMD master encryption key. In fact, it may take a minimum of five independent subsystem compromises before it is possible to recover the SSMD master encryption key in any way other than brute force.

Figure 2:
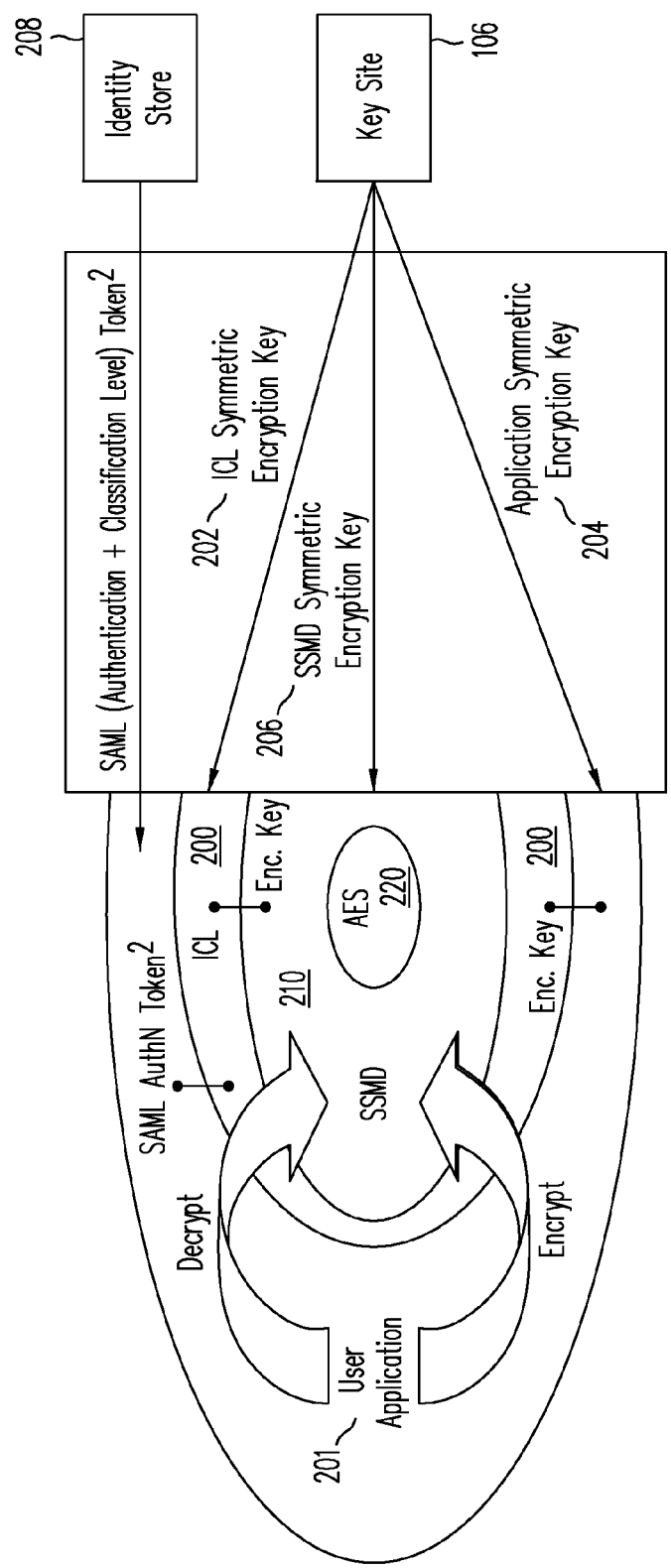
FIG. 2 is a system diagram illustrating interaction of an application with an identity classification layer in accordance with an embodiment of the present invention.

Referring to FIG. 2, an example of interaction of a user application 201 with an Identity Classification Layer (ICL) 200 to restrict, by identity, access to data is illustrated in accordance with an embodiment. FIG. 2 shows two parts to the interaction model: 1) a data encryption or encoding path, and 2) a data decryption or decoding path.

The data encryption path may be described as follows. Application 201 has some data that it assigns a classification level to based on a data classification policy. The data also has a unique ID, e.g., the application 201 may have an identifier specific to the particular body of data and distinct from any such identifier for any other body of data. Application 201 then obtains an encryption key from a key site, such as key site 106. The data, plus its classification level, plus an expiration time for the data, plus the encryption key are then sent to an ICL layer encoder. ICL 200 obtains its master encryption key 202 from key site 106. ICL encoder then uses byte-wise addition mod 256 on the ICL master key 202, an application key 204, and the unique ID to obtain a new derived SSMD encryption key 206. The additions may be done right to left, for example, on the least significant bytes. This SSMD encryption key 206 is later passed to an SSMD layer 210. The purpose of the preceding, e.g., the construction of SSMD encryption key 206, is to tie an application key 204 to the ICL key 202 in such a way that one cannot go around ICL layer 200 to get access to data. This then positions ICL layer 200 as the enforcement point for data access based on identity classification. The data, plus its expiration time (e.g., a unique point in time, such as date and time to the second), its classification level, and the new derived SSMD encryption key 206 are then sent to an encoder for an SSMD layer 210. SSMD layer encoder then encrypts the data as described in further detail below with reference to FIG. 4, and the resulting encrypted data is returned back to the application 201.

The data decryption path may be described as follows. The ICL data decryption path may exploit the fact that there may be no way around ICL layer 200 to get access to the data encoded by ICL layer 200. For example, one has to go through ICL layer 200 to get to SSMD layer 210 to get to AES layer 220 to decrypt the data. This positions the ICL layer 200 decoder as the data access enforcement point, as further described below.

The ICL layer 200 decoder requires that an application 201 first authenticate itself to an identity store 208 (e.g., implemented using identity and access management tool such as ASAC), and obtain a SAML-like authentication credential (assertion) along with the data classification level associated with that identity. For instance, application 201 (e.g., a search front end or a user using that application, e.g., Joe) authenticates itself to identity store 208 and obtains an Identity Assertion Token plus the data access classification level of 1 (or Internal), meaning, for example, that this identity (Joe) is able to access any data that is SSMD-marked as Internal or Public, as long as Joe or the application Joe is using can provide the data decryption key for the data and the data has not expired.

The application 201 then provides the SSMD-encrypted data (from SSMD layer 210 as described above), the authentication token (e.g., Identity Assertion Token), the unique ID for the data, and the application decryption key (obtained from key site 106) to the ICL layer 200 decoder. ICL layer 200 decoder verifies the authentication token and extracts the identity classification level from it. The ICL layer decoder also obtains its master decryption key 202 from key site 106. The ICL layer decoder then uses byte-wise addition mod 256 on ICL master key 202, application key 204, and the unique ID of the data to obtain a new derived SSMD decryption key 206. The additions may be done right to left, on the least significant bytes. The new derived SSMD decryption key 206 is later passed to the SSMD layer 210 decryption. SSMD layer 210 then decodes the data (e.g., in a manner described below), and the resulting data is returned back to the application 201 provided it has not expired (e.g., its expiration time is not earlier than the current date and time), and the identity classification subsumes that of the data classification (e.g., the identity has sufficiently high classification to have valid access to data having the classification of the data).

Figure 3:
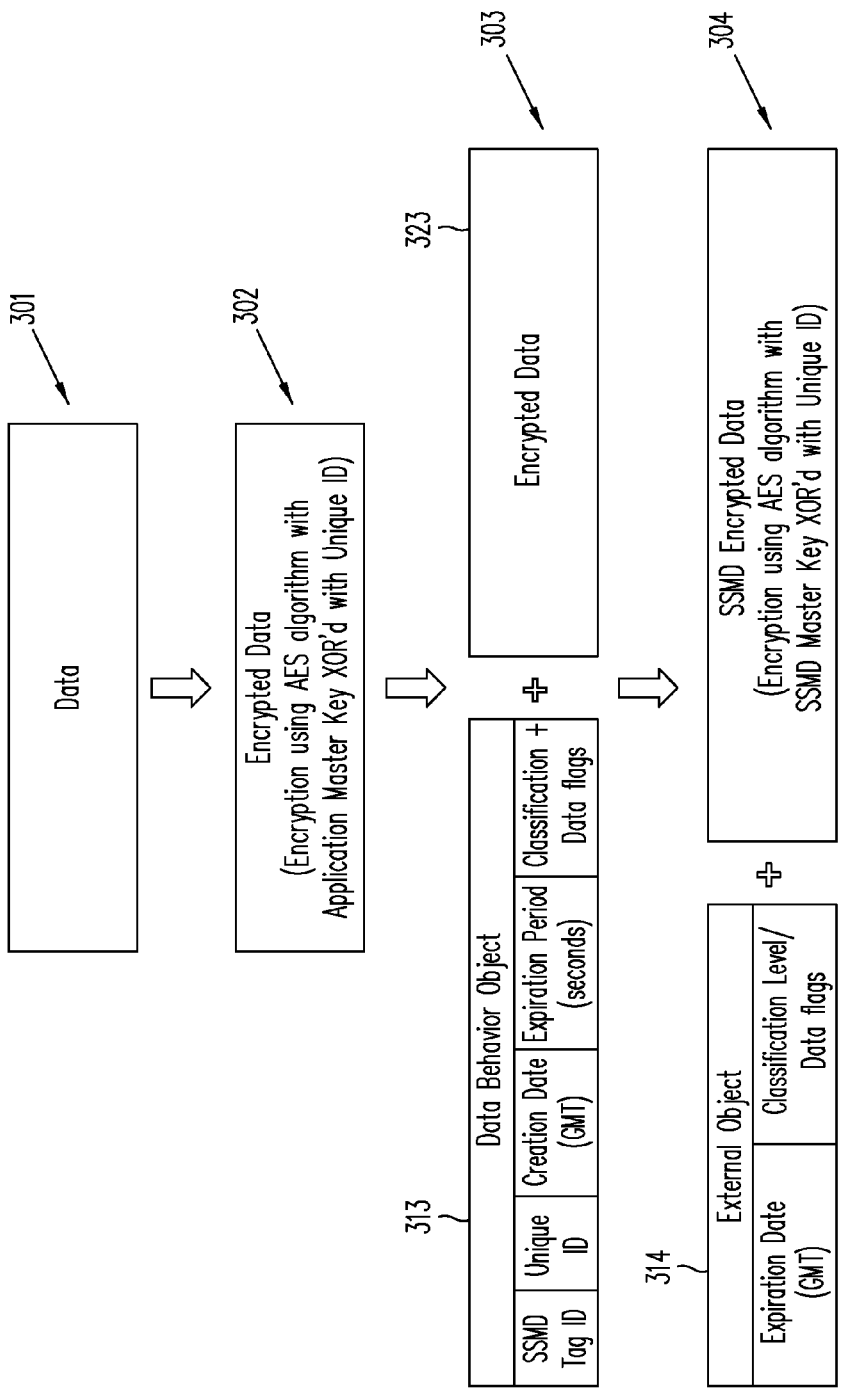
FIG. 3 is a data transformation diagram illustrating transformation of data in accordance with an embodiment of the present invention.

Referring to FIG. 3, data transformation stages of SSMD system 100, in accordance with an embodiment, are shown. SSMD system 100 may execute an algorithmic process to wrap data along with the data's policies for expiration, privacy, and classification, in such a way that access to the data for purpose of viewing it requires the use of the SSMD data protection layer, e.g., SSM layer 210. At the core of the SSMD algorithmic process are two operations: encrypt and decrypt.

FIG. 3 illustrates an example of data transformation stages during an encryption operation in accordance with one embodiment. Stage 301 shows the data as presented to the SSMD encoder (for encryption). At stage 302, the data is encrypted via AES using the XOR of the application key, and unique ID associated with the data. Stage 303 indicates the creation and association of a data behavior object 313 to an encrypted data 323. Stage 304 indicates the re-encryption of data 323 from stage 303 with the SSMD encryption key and the unique ID associated with the data (The data behavior object 313 may also be encrypted with the SSMD encryption key and the unique ID associated with the data.) Stage 304 also creates an external data context object 314 (also referred to as external object) that enables external applications that need to know the expiration time, or classification level of the data, to see that without decrypting the data or the data behavior object 313. For instance, recurring batch applications that come around periodically to purge or archive expired data need only to view this data, e.g., the information provided by external object 314. The SSMD decode operation ignores this external data, i.e., external object 314, and instead relies on the encrypted tamper-proof data behavior object 313.

An example data schema, and data sizes associated with the data elements referenced in FIG. 3 may be provided as follows.

| | |
|---|---|
| Data: | unlimited length (in bytes). |
| Encrypted data: | same length as data. |
| Data behavior object: | 26 bytes. |
| SSMD Tag ID: | 4 bytes (0x55ED - hexadecimal representation). |
| Unique ID: | 8 bytes. |
| Creation Date: | 8 bytes (GMT). |
| Expiration period: | 4 bytes (seconds). |
| Data classification: | 1 byte. |
| Data flags: | 1 byte. |
| External Object: | 10 bytes |
| Expiration date: | 8 bytes (GMT) |
| Classification + reserved byte: | 2 bytes |
| SSMD encoded data: | data length + 36 bytes |
| AES encryption key: | 128 or 256 bits (unique ID is XOR'd with least significant bits of AES key). |

Figure 4:
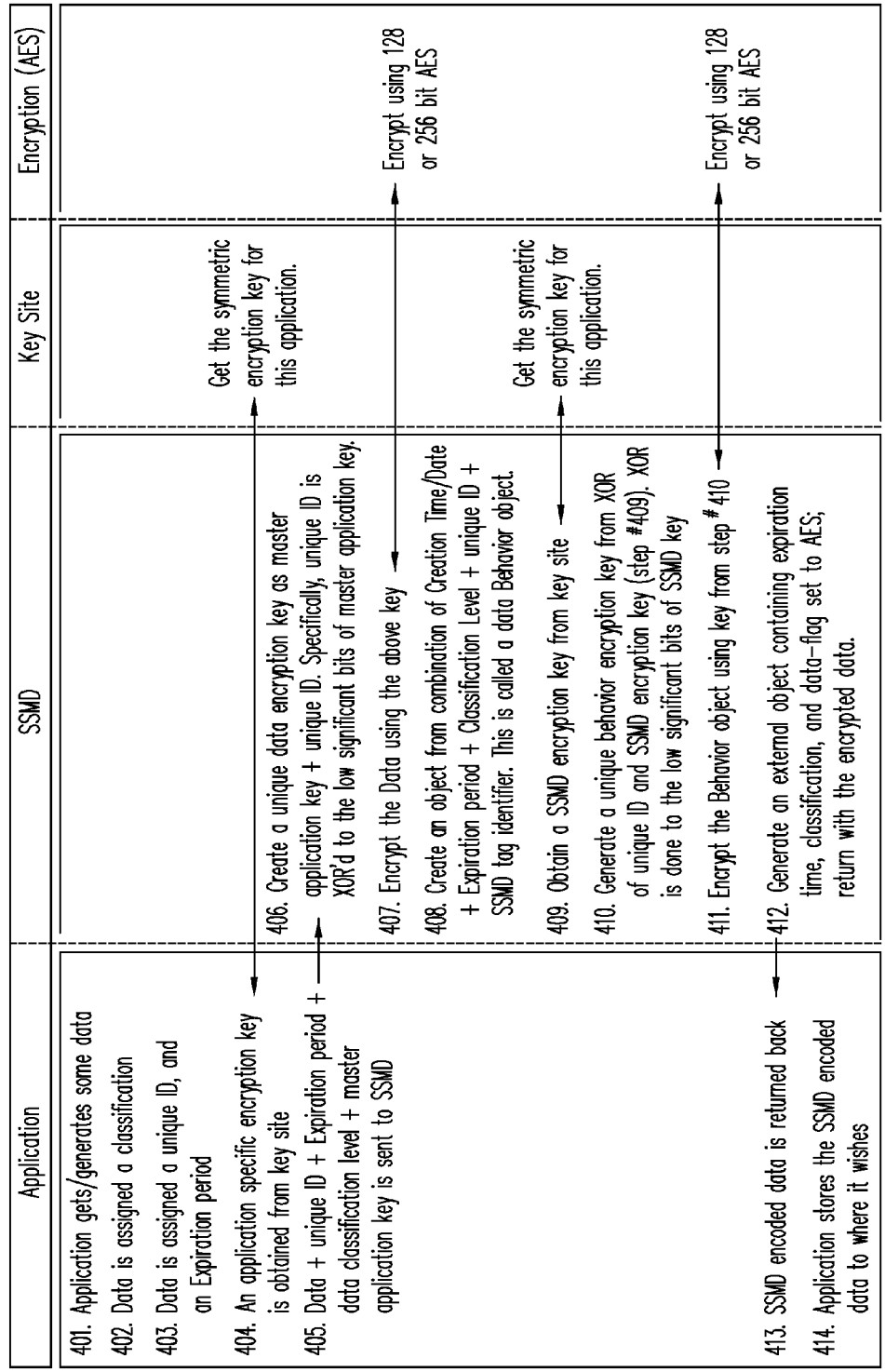
FIG. 4 is a flowchart diagram illustrating data encryption in accordance with an embodiment of the present invention.

Referring to FIG. 4, an example sequence for an SSMD encrypt operation is shown in accordance with an embodiment. At the application or data handling layer (steps 401-405 and 413-414), at step 401, a user application, e.g., application 201, may generate, or otherwise provide, some data to SSMD system 100. At step 402, the data is assigned a classification level. At step 403, the data is assigned a unique ID, and an expiration period. At step 404, an application specific master encryption key (e.g., key 204) is obtained from key site 106. At step 405, the data+unique ID+expiration period+data classification level+master application key is sent to SSMD layer 210 for encoding. At step 413, the SSMD encoded data is returned back from SSMD layer 210 to application 201. At step 414, application 201 stores the SSMD encoded data where it wishes.

At the SSMD, or data+behavior encrypting, layer (steps 406-412) at step 406, SSMD system 100 creates a unique data encryption key as a master application key (e.g., key 204)+ unique ID. Specifically, the unique ID may be XOR'd to the least significant bits of master application key. At step 407, SSMD system 100 encrypts the data using the unique data encryption key, using, for example, the AES cryptographic algorithm. At step 408, SSMD system 100 creates a data behavior object (e.g., data behavior object 313) from a combination of creation time/date+expiration period+classification level+unique ID+an SSMD Tag ID. The time/date may, for example, be in GMT format and expiration period may be in seconds. At step 409, an SSMD specific master encryption key (e.g., key 206) is obtained from key site 106. At step 410, unique behavior encryption key is generated from the XOR of the unique ID and the SSMD master encryption key. The XOR operation may be done, for example, to the least significant bits of the SSMD master key (e.g., key 206). At step 411, SSMD system 100 encrypts the behavior object+encrypted data using the unique behavior encryption key. At step 412, an external object (e.g., object 314) containing, for example, the expiration date in GMT format and classification level is generated and appended to the SSMD encoded data. The data-flag may be set, for example, to AES to indicate the encryption algorithm used, and the external object may be returned to application 201 with the SSMD encoded data.

The data schema and data size information, for encryption process, is similar to that given above. Specifically:

The SSMD Tag ID may be set to 0x55ED (hexadecimal).

Creation date, and expiration dates may be in GMT format (e.g., micro-seconds since Jan. 1, 1970).

Expiration period may be in seconds.

Data classification level may be a number from 0 to 3, e.g., 0=Public, 1=Internal, 2=Confidential, 3=Restricted.

Low order bits of data flags may determine if the data payload was previously encrypted. For example, if set to 0x01, that states that the payload was previously encrypted, and no decryption of the payload need happen during the SSMD decryption process. The rest of the bits may determine the encryption algorithm to use, for example, 0x02=AES, 0x04=3DES (3d Data Encryption Standard), 0x08=ECC (Elliptic Curve Cryptography), 0x10=128-bit, 0x20-0x80=reserved. In one embodiment, the default encryption algorithm is AES, so the 0x02 bit is always set to 1 for that embodiment.

The unique ID (64 bits, or 8 bytes) may be XOR'd to the least significant bits of the application key (e.g., key 204) and the SSMD encryption key (e.g., key 206), to make up a unique key.

Total SSMD encryption overhead may be 36 bytes.

An example Java call interface for the encryption operation is as follows:

byte[ ] EncryptSSMD (byte[ ] baData, byte[ ] baEncryptionKey, byte[ ] baUniqueID, int iClassification, int iExpiration) throws exInvalidInput;

For the above expression, the following explanations may be given.

baData—Array of bytes representing the input data to encrypt using, for example, the method illustrated in FIG. 4. The array size may be unbounded.

baEncryptionKey—The caller provider encryption key. For the AES algorithm, the encryption bit key length may be 128 or 256 bits (16 or 32 bytes). If baEncryptionKey is set to Null, baData will not be doubly encrypted by EncryptSSMD. Only single encryption for the outer SSMD envelope (e.g., stage 303 shown in FIG. 3) will apply in this case.

baUniqueId—The unique ID associated with the baData. This may be alpha-numeric and up to 8 bytes. If baUniqueID is set to Null, no unique key for the internal (inner) encryption (e.g., stage 302 shown in FIG. 3) of the baData is generated. This mode enables a group of items to be encrypted using the same baEncryptionKey.

iClassification—The data classification level associated with the baData. The data classification level, for example, may be 0 (public), 1 (internal), 2 (confidential), or 3 (restricted).

iExpiration—The data expiration period in seconds. For example, 15 minutes data expiration is sent as 900. If no data expiration is required, the value should be set to 2^32-1 or 1,073,741,823. This is roughly 34 years.

exInvalidInput—This exception may be returned if any provided input data is invalid. For example, if the classification level value is outside the supported range of 0 to 3.

The returned data may be a byte array having a baData length plus 36 bytes. SSMD system 100 may use the cryptography-provider of its choice (for example, but not limited to AES, 3DES, ECC), and may use the data-flags to encode which provider it used. In one embodiment, AES 128-bit may be used.

Referring to FIG. 5, an example sequence for an SSMD decrypt operation is shown in accordance with an embodiment. The SSMD system 100 decryption process may ignore the external data object 314. Instead, the SSMD system 100 decryption process may rely on the encrypted and tamper-proof data in the behavior data object 313 to determine, for example, if the data is expired or the classification levels match. Also, the SSMD decryption process may not question the validity of the identity classification level passed to it. Such questioning or validation may be delegated to the calling application layer (see, e.g., FIG. 2). In one embodiment, SSMD system 100 may put a "wrapper" around the SSMD decryption process to accept a SAML authentication token (see, e.g., FIG. 2), and directly validate the identity classification level. The SSMD system 100 decrypt process may allow for an identity classification level of 4, e.g., outside the range of 0 to 3 classification levels. Level 4 classification, if provided, may override the SSMD data expiration check and return expired or unexpired objects. The use of level 4 classification may be strictly supervised, and may be audit logged. The use of level 4 classification may be provided for Sarbanes-Oxley and Payment Card Industry (SOX/PCI) compliance cases, when an item has expired that may need to be kept around, and be retrievable, for compliance reasons. The use of level 4 classification may be used when the above "wrapper" and validation process is put in place to enforce Identity to Classification mapping.

Continuing with FIG. 5, at the application, or data handling layer (steps 501-505 and 513) at step 501, some application (e.g., application 201) needs access to some SSMD encoded data. At step 502, data classification level of the identity associated with the application is obtained. At step 503, the SSMD encoded data and the unique ID associated with the SSMD encoded data is obtained. At step 504, an application specific master encryption key (e.g., key 204) is obtained from key site 106. At step 505, SSMD data+unique ID+classification level+master application key is sent to SSMD layer 210 for decoding. At step 513, SSMD decoded data is returned back from SSMD layer 210 to application 201 if the data has not expired and the classification level of the application subsumes that of the requested data.

At the SSMD, or data decoding+behavior validation, layer (steps 506-512) at step 506, SSMD system 100 may obtain an SSMD specific master encryption key (e.g., key 206) from key site 106. At step 507, a behavior decryption key is generated from XOR of unique ID and SSMD master encryption key. XOR operation may be done to the least significant bits of the SSMD master key (e.g., key 206). At step 508, SSMD decrypts the SSMD data using the behavior decryption key and the cryptography algorithm per the data-flags. At step 509, SSMD obtains the behavior object from the decrypted data; validates the SSMD Tag ID to make sure the decryption succeeded correctly; checks the classification level of the caller (e.g., application 201 or its user) to the classification level of the data—the caller classification level must subsume that of the data—and checks the expiration time (e.g., date and time) against the current time to validate that the data is not expired. If any check fails, an exception is returned to the caller application, e.g., application 201. At step 510, SSMD system 100 creates a data decryption key using the master application key+unique ID. For example, the unique ID may be XOR'd to the least significant bits of the master application key (e.g., key 204). At step 511, SSMD system 100 decrypts the data using the data decryption key. At step 512, SSMD layer 210 returns the decrypted data (also referred to as SSMD decoded data) to the calling application 201.

An example Java call interface for the decryption operation is as follows:

byte[ ] DecryptSSMD (byte[ ] baData, byte[ ] baDecryptionKey, byte[ ] baUniqueID, int iClassification) throws exInvalidInput; exDataExpired, exAccessDenied;

For the above expression, the following explanations may be given.

baData—Array of bytes representing the input data to decrypt using, for example, the method illustrated in FIG. 5. The array size may be unbounded.

baDecryptionKey—The caller provider decryption key. For the AES algorithm, the encryption bit key length may be 128 or 256 bits (16 or 32 bytes). If baDecryptionKey is set to Null, an encrypted data object, as provided to EncryptSSMD call may be returned.

baUniqueId—The unique ID associated with the baData. This may be alpha-numeric and up to 8 bytes. If baUniqueID is set to Null, no unique key for the internal (inner) encryption (e.g., stage 302 shown in FIG. 3) of the baData may be generated.

iClassification—The classification level associated with the caller needing the data, e.g., application 201. The classification level may be, for example, 0 (public), 1 (internal), 2 (confidential), or 3 (restricted). This caller classification level (e.g., classification level of the identity associated with the application) may be greater than or equal to the data classification level in order for SSMD decoded data to be returned. Classification level 4 may be optionally supported, and when available may enable recovery of expired data. Use of level 4 may be audit logged.

exInvalidInput—This exception may be returned if any provided input data is invalid. For example, if the classification level value is outside the supported range of 0 to 4.

exDataExpired—This exception may be returned if the data has expired.

exAccessDenied—This exception may be returned, for example, if the decryption key is wrong or the classification level of the SSMD data is higher than the provided classification level.

The returned data may be a byte array having a baData length minus 36 bytes. SSMD system 100 may ignore the external object (e.g., external object 314, which may comprise a 10 byte leader to the encrypted data), which may be provided for external applications to use. SSMD system 100 may use the internal values (e.g., from data behavior object 313) for the same items (e.g., classification leveland expiration time). The internal values may be tamper-proof. SSMD system 100 may, however, use the data-flags portion of external object 314 to determine which decryption algorithm to use.

The following considerations may apply to SSMD system 100 encryption and decryption. Unique encryption keys may be generated by XOR'ing the unique ID with the master encryption keys (e.g., application key 204 or SSMD key 206). The master application encryption key may be 128 or 256 bits. The SSMD master key may be 256 bits. The unique ID may be 64 bits. Application key length may be determined by the number of bytes passed to the EncryptSSMD function. If 128-bit encryption is used, the bit 0x10 in the data-flags may be set to 1. XOR'ing unique ID to the master key may not weaken it in any sense, but may create a unique key for each encrypted data object (XOR may be done to the least significant bits of master encryption keys). Implementation-wise, SSMD may be considered to be a wrapper class to AES (or 3DES, or ECC) encryption crypto class. The data-flags may determine which underlying crypto algorithm is used, for example, 0x01=data already encrypted as OR'd into 0x02=AES, 0x04=3DES, 0x08=ECC, 0x10=128-bit, reserved, 0x40=reserved, and 0x80=reserved.

The data may be double encrypted, for example, once encrypted using the application master key, and once encrypted using the SSMD key. This ties the life-cycle of the data directly to the SSMD layer 210. That is, it is not possible to go around SSMD layer 210 by using the crypto algorithm directly. One needs the SSMD encryption key to use the crypto algorithm. Thus, one has to go through SSMD layer to get to the data.

The SSMD Tag ID protects (checks) against decryption with the wrong master encryption key (SSMD or application key). It also protects against differential crypto-analysis attack. SSMD system 100 checks for data expiration before decoding and returning the data. The expiration data is protected by the SSMD encryption key, and cannot be tampered with externally. The external data object containing expiration time and classification level is ignored by SSMD. The external data object is for external application access (e.g., a clean-up batch job) to determine if the object is expired without needing the application key to ask SSMD to decrypt the object and determine if it has expired. The external (and internal) data-flags determine which underlying crypto algorithm is used, for example, 0x01=data already encrypted OR'd into 0x02=AES, 0x04=3DES, 0x08=ECC, 0x10=128-bit, 0x20=reserved, 0x40=reserved, 0x80=reserved. SSMD checks for classification level of the caller before decoding and returning the data. The caller data classification level subsumes that of the encoded data. For example: if the caller has top-secret classification and data has classified classification, then data decoding succeeds. All levels 1 through 4 access may be audit logged. SSMD layer 210 may delegate the job of mapping identity to classification level to layers above it. In other words, SSMD layer 210 may accept the input data it is given. This properly positions SSMD system 100 to become an integral part of an identity classification strategy (described above with reference to FIG. 2), if such an approach is implemented. In that strategy, SSMD layer 210 may be the classification enforcement point.

Data that is expired can be recovered if the identity classification level is L4. This mode, which represents the highest level of identity classification privilege, may be added to support recovery of expired data. Support for L4 identity classification is optional, and up to each SSMD implementation. All levels 1 through 4 may be audit logged. Expiration policy may be based on the number of seconds past the creation date. The creation date may be set to the time the SSMD data object was first created. The creation date is in GMT format (e.g., micro-seconds elapsed since Jan. 1, 1970). The format may be used in Java as Type Long. The strength of this algorithm is strictly based on the strength of the underlying public-key crypto algorithm. As long as the SSMD encryption key is properly secured at key site 106 and elsewhere (see, e.g., FIG. 1 for SSMD key management strategy), there may be no other protocol failures. Even compromise of the application encryption key may not result in the compromise of the SSMD encrypted data.

Each data encryption pass through SSMD may produces a different encrypted data output, even when the same encryption key and the same data is being encrypted. This is because each encryption pass mixes in a nonce (a unique creation time stamp) that results in a different encrypted output. This also protects against dictionary attack. For flexibility, at the application and AES encryption algorithm level, it is possible to do the following: 1) Submit an already encrypted data payload to SSMD with the requirement to not to internally encrypt it again. This is accomplished via setting the application encryption key to Null. SSMD then treats the data as an opaque object and will not encrypt it. 2) Submit the same application key for a group of objects. This is accomplished by setting the unique ID to Null. In this case, the XOR will have no effect, and all objects will be encrypted using the same application master key. 3) Rotate the SSMD key in key site 106 from time to time without affecting the objects that were encrypted with that key in the past. This may be accomplished by actually having two SSMD master keys. The first key is the master main-key, and may never be changed. This master main-key is itself encrypted with the second key. The second key may be a random key that can change from time to time, and may be used to encrypt the master main-key. The second key is always saved in key site 106, see e.g., FIG. 1.

Example One

As part of a safe credit card processing project for merchants, it is often required to store the credit card data, including the CVV, in a scratch wallet in a Payment Gateway environment while the credit card (CC) transaction is being processed. Once the CC processing is complete, successfully or not, for PCI compliance reasons, it is desired to remove the data. The following business and technical requirements may then be imposed on this project: 1) Business requirement: Securely store CVV data in scratch wallet portion of PGW until the credit card authorization is complete; 2) PCI requirement: Minimize the amount of CVV data storage, to about 15 minutes max; 3) InfoSec requirement: individually encrypt content of each wallet, so if one is compromised, it does not affect the rest; and 4) InfoSec/PCI requirement: delete (or expire) the CVV encrypted data as soon as its processing is complete.

All of the preceding requirements may be met by using SSMD system 100. In particular: a) Wallet ID can be the unique ID for each CVV scratch storage item. Thus, using SSMD encryption mode, and only "one" application master key, retrieved from key site 106, it is possible to create uniquely encoded CVV scratch objects in PGW for each CC object. This addresses requirement #3; b) Since SSMD encrypts the data, requirement #1 can be met by storing SSMD encrypted data in a scratch wallet. This data will be encrypted with a unique key; and c) Requirements #2 and #4 can be met by setting the expiration time to 15 minutes, or 900 seconds when invoking SSMD encryption operation. The data will then self-expire and will not be available for further use or view.

While the CC data sits in a scratch area, it may be completely secure. Once the payment processing application ends, if the data has not been cleaned up, it may expire on its own. Regular PGW scratch area clean-up may then remove any SSMD encoded data that has expired and not been removed from scratch area. However, there is no need to enforce the time limit on how often the scratch area is cleaned up. The SSMD data that has expired will not be accessible once it has expired.

Example Two

URL encryption in an email verification step is illustrated by the following example. As part of a verification step during a new user registration process, it is often required to send that user an email to verify their contact email address. In that email, there is a URL with encrypted parameter data that the new user must click on to return back to a merchant or provider site, and thus verify their email account. On return to the site upon clicking on the URL, the user identity should be re-established, and any registration context for that user should be loaded from user store to complete the registration process. The following business and technical requirements may then be imposed on this project: 1) InfoSec requirement: any URL parameter data sent via email is encrypted; 2) Business requirement: URL data (the email action) is good for up to 180 days; 3) Business requirement: upon clicking on the URL and returning back to the site, enough user context is provided, as part of the encrypted URL to continue the registration process from where it left off; 4) InfoSec requirement: only EIAS_ID (eBay encoded Oracle ID for the eBay user) is allowed to be exposed as a reference to the registered user; and 5) InfoSec requirement: each URL encryption must be unique, so if one is compromised, they are not all compromised.

All of the above requirements may be met by using SSMD system 100. In particular: a) EIAS_ID should be used as the unique ID for the SSMD encryption process; b) Using EIAS_ID and only one encryption master key obtained by verification process from key site 106, it is possible to generate unique encryption keys for all URL's. This satisfies requirements #1, and #5; c) EIAS_ID+the SSMD encrypted data is sent as parameters of the URL included in the verification email. This satisfies requirement #1 and #4; d) On clicking on the URL and returning back to the site, EIAS_ID is used for both kick-starting the SSMD decryption process (as unique ID), and to find out which registered user is being verified. This is because EIAS_ID is algorithmically equivalent to eBay Oracle ID for an eBay user. This satisfies requirement #3; e) During SSMD encryption, the expiration period should be set to 180 days, or (180*24*60*60=15,552,000) seconds. This satisfies requirement #2; and f) Any data needed to continue the registration process can be safely encrypted in the URL via the SSMD encryption process. This satisfies requirement #3.

In implementation of the various embodiments, embodiments of the invention may comprise a personal computing device, such as a personal computer, laptop, PDA, cellular phone or other personal computing or communication devices. The payment provider system may comprise a network computing device, such as a server or a plurality of servers, computers, or processors, combined to define a computer system or network to provide the payment services provided by a payment provider system.

In this regard, a computer system may include a bus or other communication mechanism for communicating information, which interconnects subsystems and components, such as processing component (e.g., processor, micro-controller, digital signal processor (DSP), etc.), system memory component (e.g., RAM), static storage component (e.g., ROM), disk drive component (e.g., magnetic or optical), network interface component (e.g., modem or Ethernet card), display component (e.g., CRT or LCD), input component (e.g., keyboard or keypad), and/or cursor control component (e.g., mouse or trackball). In one embodiment, disk drive component may comprise a database having one or more disk drive components.

The computer system may perform specific operations by processor and executing one or more sequences of one or more instructions contained in a system memory component. Such instructions may be read into the system memory component from another computer readable medium, such as static storage component or disk drive component. In other embodiments, hard-wired circuitry may be used in place of or in combination with software instructions to implement the invention.

Logic may be encoded in a computer readable medium, which may refer to any medium that participates in providing instructions to the processor for execution. Such a medium may take many forms, including but not limited to, non-volatile media, volatile media, and transmission media. In various implementations, non-volatile media includes optical or magnetic disks, such as disk drive component, volatile media includes dynamic memory, such as system memory component, and transmission media includes coaxial cables, copper wire, and fiber optics, including wires that comprise bus. In one example, transmission media may take the form of acoustic or light waves, such as those generated during radio wave and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer is adapted.

In various embodiments, execution of instruction sequences for practicing the invention may be performed by a computer system. In various other embodiments, a plurality of computer systems coupled by communication link (e.g., LAN, WLAN, PTSN, or various other wired or wireless networks) may perform instruction sequences to practice the invention in coordination with one another.

Computer system may transmit and receive messages, data, information and instructions, including one or more programs (i.e., application code) through communication link and communication interface. Received program code may be executed by processor as received and/or stored in disk drive component or some other non-volatile storage component for execution.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present invention to the precise forms or particular fields of use disclosed. It is contemplated that various alternate embodiments and/or modifications to the present invention, whether explicitly described or implied herein, are possible in light of the disclosure. Having thus described various example embodiments of the disclosure, persons of ordinary skill in the art will recognize that changes may be made in form and detail without departing from the scope of the invention. Thus, the invention is limited only by the claims.

What is claimed is:

1. A method for securing data, the method comprising:
assigning a classification level to the data;
assigning a unique identification (ID) to the data;
assigning an expiration period to the data;
obtaining a master application key for encryption from a key site, wherein the master application key is specific to a user application;
the master application key is encrypted using a master key seal key; and
the encrypted master application key is broken into multiple parts that are stored separately;
generating a main secure self-managed data (SSMD) key using the unique ID and the master application key, wherein the generated main SSMD key is never stored anywhere and is not shared; and
encoding the data, unique ID, expiration period, and data classification level using the generated main SSMD key that is never stored anywhere and is not shared, wherein the encoded data and encoded unique ID, expiration period, and data classification level form an SSMD encoded data, wherein:
the generated SSMD key that is not stored anywhere and is not shared is used to decode the SSMD encoded data, including decoding the data classification level of the SSMD encoded data included in the SSMD encoded data.

2. The method of claim 1, further comprising:
forming an external object including at least one of an expiration date for the data and the classification level for the data, wherein
the external object is appended to the SSMD encoded data.

3. The method of claim 1, wherein:
a user application provides the data; and
the user application stores the SSMD encoded data.

4. The method of claim 1, wherein:
a user application provides the data; and
the SSMD encoded data and an appended external object is returned to the user application.

5. The method of claim 1, wherein encoding the data, unique ID, expiration period, and data classification level to form an SSMD encoded data comprises:
creating a unique data encryption key from the master application key and the unique ID;
encrypting the data using the unique data encryption key;
creating a data behavior object using a creation time and the expiration period, the classification level, and the unique ID;
obtaining an SSMD master encryption key from a key site;
generating a unique behavior encryption key from the unique ID and the S SMD master encryption key;
using the unique behavior encryption key to encrypt the data behavior object together with the already-encrypted data, encrypted using the unique data encryption key; and
forming the SSMD encoded data from the encrypted data behavior object and doubly encrypted data.

6. The method of claim 5, wherein the data behavior object includes an SSMD tag identifier.

7. The method of claim 2, wherein:
the external object includes the expiration time for the data; and
the expiration time for the data is accessible from the external object without decryption.

8. The method of claim 2, wherein:
the external object includes the classification level for the data; and
the classification level for the data is accessible from the external object without decryption.

9. A method for accessing secure data by an application, the method comprising:
obtaining a classification level of an identity associated with the application;
obtaining a secure self-managed data (SSMD) encoded data and a unique ID associated with the SSMD encoded data;
obtaining a master application key for encryption from a key site, wherein;
the master application key is specific to the application;
the master application key is encrypted using a master key seal key; and
the encrypted master application key is broken into multiple parts that are stored separately;
generating an SSMD key using the unique ID and the master application key, wherein the generated SSMD key is not stored anywhere and is not shared;
using the generated SSMD key that is not stored anywhere and is not shared to decode the SSMD encoded data, including decoding a classification level of the SSMD encoded data included in the SSMD encoded data, wherein:
the data unique ID, expiration period, and data classification level were encoded using the generated main SSMD key that is never stored anywhere and is not shared, and
returning the decoded SSMD encoded data to the application if the data has not expired and the classification level of the identity associated with the application subsumes the classification level of the SSMD encoded data.

10. The method of claim 9, wherein decoding the SSMD encoded data further comprises:
   obtaining an SSMD master encryption key from a key site;
   generating a behavior decryption key from the unique ID and the SSMD master encryption key;
   using the behavior decryption key to decrypt the SSMD encoded data; and
   obtaining a data behavior object from the decrypted SSMD encoded data.

11. The method of claim 10, wherein decoding the SSMD encoded data further comprises:
   using the data behavior object obtained from the decrypted SSMD encoded data to check the classification level of the identity associated with the application against the classification level of the data;
   using the data behavior object obtained from the decrypted SSMD encoded data to check an expiration time of the data against a current time to determine if the data has not expired; and
   returning an exception to the application if either check fails.

12. The method of claim 9, wherein decoding the SSMD encoded data further comprises:
   creating a data decryption key from the master application key and the unique ID;
   decrypting the data using the data decryption key; and
   returning the decrypted data to the application.

13. The method of claim 9, wherein:
   an external data object is appended to the SSMD encoded data; and
   the application checks the external data object without decryption to determine if SSMD encoded data has expired.

14. The method of claim 10, wherein the data behavior object includes an SSMD tag identifier.

15. The method of claim 13, wherein:
   the external object includes the expiration time for the data; and
   the expiration time for the data is accessible from the external object without decryption.

16. The method of claim 13, wherein:
   the external object includes the classification level for the data; and
   the classification level for the data is accessible from the external object without decryption.

17. A system comprising:
   a memory for storing computer readable and executable instructions for execution by one or more processors; and
   one or more processors configured for
   assigning a classification level to the data;
   assigning a unique identification (ID) to the data;
   assigning an expiration period to the data;
   obtaining a master application key for encryption from a key site, wherein;
   the master application key is specific to a user application;
   the master application key is encrypted using a master key seal key;
   the encrypted master application key is broken into multiple parts that are stored separately;
   generating a main secure self-managed data (SSMD) key using the unique ID and the master application key, wherein the generated main SSMD key is never stored anywhere and is not shared; and
   encoding the data, unique ID, expiration period, and data classification level using the generated main SSMD key that is never stored anywhere and is not shared, wherein the encoded data and encoded unique ID, expiration period, and data classification level form an SSMD encoded data; and
   decoding the SSMD encoded data using the generated SSMD key that is stored anywhere and is not shared, including decoding a classification level of the SSMD encoded data included in the SSMD encoded data.

18. The system of claim 17, wherein the one or more processors are further configured for:
   forming an external object including at least one of an expiration date for the data and the classification level for the data, wherein
   the external object is appended to the SSMD encoded data.

19. The system of claim 18, wherein:
   the external object includes the expiration time for the data; and
   the expiration time for the data is accessible from the external object without decryption.

20. The system of claim 18, wherein:
   the external object includes the classification level for the data; and
   the classification level for the data is accessible from the external object without decryption.

* * * * *